United States Patent
Bruestle et al.

(10) Patent No.: US 7,421,266 B1
(45) Date of Patent: Sep. 2, 2008

(54) INSTALLATION AND CONFIGURATION PROCESS FOR WIRELESS NETWORK

(75) Inventors: Jeremy J. Bruestle, Seattle, WA (US); Terrance L. Lillie, Redwood City, CA (US); Christian Wiedmann, Redwood City, CA (US); Robert Zejlko, San Jose, CA (US); Richard P. Sneiderman, Sunnyvale, CA (US); Ulrich Wiedmann, Redwood City, CA (US)

(73) Assignee: McAfee, Inc., Santa Clara, CA (US)

( * ) Notice: Subject to any disclaimer, the term of this patent is extended or adjusted under 35 U.S.C. 154(b) by 705 days.

(21) Appl. No.: 10/640,434

(22) Filed: Aug. 12, 2003

Related U.S. Application Data

(60) Provisional application No. 60/402,993, filed on Aug. 12, 2002.

(51) Int. Cl.
 *H04M 1/66* (2006.01)
 *H04M 1/68* (2006.01)
 *H04M 3/16* (2006.01)

(52) U.S. Cl. ............... 455/411; 455/410; 379/189; 379/161

(58) Field of Classification Search ............ 455/411, 455/410, 522, 509; 379/161, 168, 1, 168.1, 379/184, 194, 189; 380/247–250; 370/352–356, 370/254, 338; 709/245
See application file for complete search history.

(56) References Cited

U.S. PATENT DOCUMENTS

| | | | |
|---|---|---|---|
| 7,171,555 B1 | 1/2007 | Salowey et al. ............ 713/156 |
| 7,174,564 B1* | 2/2007 | Weatherspoon et al. ........ 726/2 |
| 7,325,246 B1 | 1/2008 | Halasz et al. ................ 726/2 |
| 2002/0009199 A1 | 1/2002 | Ala-Laurila et al. ......... 380/274 |
| 2002/0076054 A1* | 6/2002 | Fukutomi et al. .......... 380/277 |
| 2002/0178365 A1 | 11/2002 | Yamaguchi ................ 713/182 |
| 2003/0014646 A1* | 1/2003 | Buddhikot et al. ......... 713/184 |
| 2003/0095663 A1 | 5/2003 | Nelson et al. .............. 380/270 |

(Continued)

FOREIGN PATENT DOCUMENTS

EP 1178644 2/2002

(Continued)

OTHER PUBLICATIONS

Aboba B. et al. "Radius Support For Extensible Authentication Protocol (EAP)" Internet Draft, May 15, 2003.

(Continued)

*Primary Examiner*—Charles N Appiah
*Assistant Examiner*—Emem Stephen
(74) *Attorney, Agent, or Firm*—Zilka-Kotab, PC; Christopher J. Hamaty

(57) ABSTRACT

An access point to be installed in a wireless network is automatically discovered and associated with an authentication center adapted to provide remote authentication services for the wireless network. This may be accomplished by executing an address resolution protocol scan of nodes on the wireless network and identifying from the scan results the access point to be installed. Configuration information regarding the access point is then transmitted to the authentication center and the access point is configured to use the authentication center for 802.1x authentication services for the wireless network.

26 Claims, 6 Drawing Sheets

U.S. PATENT DOCUMENTS

| | | | |
|---|---|---|---|
| 2003/0099362 A1 | 5/2003 | Rollins | 380/278 |
| 2003/0200455 A1 | 10/2003 | Wu | 713/200 |
| 2003/0204574 A1* | 10/2003 | Kupershmidt | 709/220 |
| 2003/0219129 A1 | 11/2003 | Whelan et al. | 380/270 |
| 2003/0224797 A1 | 12/2003 | Kuan et al. | 455/446 |
| 2004/0003285 A1* | 1/2004 | Whelan et al. | 713/201 |
| 2004/0005873 A1* | 1/2004 | Groenendaal et al. | 455/410 |
| 2004/0005878 A1* | 1/2004 | Olin et al. | 455/414.1 |
| 2004/0023642 A1 | 2/2004 | Tezuka | 455/411 |
| 2004/0049699 A1 | 3/2004 | Griffith et al. | 713/201 |
| 2004/0063455 A1* | 4/2004 | Eran et al. | 455/525 |
| 2004/0073784 A1 | 4/2004 | Ishidoshiro | 713/151 |
| 2004/0076300 A1 | 4/2004 | Ishidoshiro | 380/277 |
| 2004/0083362 A1 | 4/2004 | Park et al. | 713/162 |
| 2004/0198220 A1* | 10/2004 | Whelan et al. | 455/41.1 |
| 2004/0203764 A1* | 10/2004 | Hrastar et al. | 455/435.1 |
| 2004/0208151 A1 | 10/2004 | Haverinen et al. | 370/338 |
| 2005/0073979 A1* | 4/2005 | Barber et al. | 370/338 |
| 2005/0083872 A1* | 4/2005 | Kubler et al. | 370/328 |
| 2006/0050862 A1* | 3/2006 | Shen et al. | 379/219 |

FOREIGN PATENT DOCUMENTS

| | | |
|---|---|---|
| EP | 1408648 | 4/2004 |
| EP | 1411674 | 4/2004 |
| EP | 1081895 B1 | 7/2005 |
| JP | 01111544 | 4/2001 |
| WO | 02/03730 | 1/2002 |
| WO | 03/025597 | 3/2003 |
| WO | WO03/029916 A2 | 4/2003 |
| WO | 03/047158 | 6/2003 |
| WO | 03/088547 | 10/2003 |
| WO | 03/096554 | 11/2003 |
| WO | 03/100559 | 12/2003 |

OTHER PUBLICATIONS

Written Opinion of the International Searching Authority from PCT application No. US2004/017732 which was filed on Apr. 6, 2004.

Search Report from PCT application No. US2004/017732 which was filed Apr. 6, 2004.

Farrow, R. Wireless Security: Send in the Clowns? www.itarchitect.com/shared/article/showArticle.jhtml?articleId=14400051, Sep. 4, 2003.

Wang et al, "A light weight authentication protocol for axis control in IEEE in 802.11" Iowa State University Department of Electrical and Computer Engineering and Department of Computer Science.

Chu, F. "Standards will filled holes in WEP authentication and encryption" eWeek.com, Feb. 3, 2003.

"Wireless repeater- Wireless products- Brief article" www.findarticles.com/p/articles/mi_M0CMN/is_3_40/ai_99114181/print.

"Quick Hits: Wireless LAN Security" www.findarticles.com/p/articles/mi_zd4168/is_200306/ai_n9518041/print.

Ellison, Craig, "SMC SMC2586W-G" www.findarticles.com/p/articles/mi_zdpcm/is_200403/ai_ziff121528/print.

"Versatile access point- Wireless access points and devices- Brief Article" www.findarticles.com/p/articles/mi_m0CMN/is_1_41/ai_112448834/print.

Computer Industry, Product Introduction, SMC Corporation, PC Magazine Mar. 12, 2004.

TELC, Telecommunications, Network World Aug. 25, 2003.

Goodwill, Gilbert, Portable Design, vol. 9, No. 11, Nov. 1, 2003.

Brewin, Bob, Computerworld vol. 36, No. 45, Nov. 4, 2002.

Strategy: Wireless security with 802.1X, eWeek Feb. 2, 2003.

Snyder, Joel, "Encryption key setting this stem and method, access point, and authentication code setting system" Network World Sep. 9, 2002.

Buddhikot, M., "Efficient authentication and key distribution in wireless IP networks" IEEE Wirel. Commun. vol. 10, No. 6, 2003/Dec. 2003.

Bakirdan, A., "security algorithms in wireless LAN: proprietary or non-proprietary" Conf Rec IEEE Global Telecommun Conf vol. 3, 2003.

Dornan, Andy, "Wireless security: he is protected accessed enough?" Network Mag. vol. 18, No. 10 2003/Oct. 2003.

Arar, Yardena, "Better 802.11 security", PC World (San Francisco, CA) vol. 21, No. 8 2003/Aug. 2003.

Allen, J. et al., "Securing a wireless network" Proc ACM SIGUCCS Serv Conf 2002.

Arbaugh, W. et al., "Security problems in 802.11-based networks", Commun ACM vol. 46, No. 5 2003/May 2003.

Hayes, Caroline, "How secure is a wireless network?" Electron Prod Des vol. 24, No. 2 2003/Feb. 2003.

Chu, F. "Wireless security improves" IT Week (UK) vol. 6, No. 24, Jun. 23, 2003.

Loutrel, M. et al., "An EAP-BT smartcard for authentication in the next generation of wireless communications" Network control and engineering for QoS, security and mobility. IFIP TC6/WG6.2 and WG6.7 Conference on Network Control and Engineering for QoS, Security and Mobility (Net-Con 2002) 2003.

Yamai, N. et al., "A user authentication system for secure wireless communication" Wireless LANs and Home Networks connecting offices and homes. Proceedings of the international conference on wireless LANS and home networks 2001.

Office Action Summary from U.S. Application No. 10/861,576 mailed on Mar. 17, 2008.

* cited by examiner

INSTALLATION AND CONFIGURATION PROCESS FOR WIRELESS NETWORK

RELATED APPLICATION

This application is related to and claims the priority benefit of U.S. Provisional Application No. 60/402,993, entitled "Installation and Configuration Process for Wireless Network", filed Aug. 12, 2002, incorporated herein by reference.

FIELD OF THE INVENTION

The present invention relates to installation and configuration processes for use in wireless computer networks and, in particular, to a process for the automated configuration of an 802.1x network in which limited user interaction is required.

BACKGROUND

Wireless computer networks have become popular options for home and small business environments because they offer relatively inexpensive alternatives to traditional, wired computer networks and freedom of mobility for client devices such as notebook computers. Indeed, this freedom has prompted the deployment of wireless subnets within some large enterprise networks. A popular technology for wireless local area networks (LANs) is based on a set of standards promulgated by the Institute for Electrical and Electronic Engineers (IEEE) under the designators 802.11, 802.11a, and 802.11b (also known as Wi-Fi). An emerging standard in this family is designated 802.1x. The 802.11 wireless LAN standards define various electrical and mechanical mandatory and optional features for Wi-Fi networks Despite increasing popularity, however, wireless networks have not been universally adopted by home and small business computer users. One reason for the seeming reluctance on the part of such users to adopt wireless networking technology is the challenged posed by the installation and configuration process for such a network. That is, the typical home or small business computer user often feels that he or she is incapable of installing the various hardware and software components of such a network and is unwilling to incur the costs of professional installation (if it is even available).

For example, some of the decisions/issues that will be faced by a user during installation of a wireless network installation include:

Assignment of a unique network name. During installation, a user will typically be prompted to provide such a name. However, existing configuration utilities often describe the name as an ESSID or extended-service-set ID. These and other acronyms are often unfamiliar to the user installing the networks (many times without any further explanation) and, as a result, the user often feels incapable of making the necessary decisions or unsure of the consequences of such decisions.

Choosing whether or not to use network address translation (NAT). NAT allows a user to hide his/her computers from the rest of the Internet by assigning dummy addresses. The wireless access point relays traffic back and forth between each client computer and the Internet, acting as an effective firewall. Many users, however, have little or no understanding of the effect of using NAT and, as a result, often cannot make intelligent decisions in this regard.

Providing Internet connection details. Users that rely on cable digital subscriber line (DSL) modems may need to enter login details for PPPoE (point to point protocol over Ethernet) connections that a broadband service provider assigned for an individual computer when the user subscribed to the service. Alternatively, some users may need to provide dial-up modem details or even static Internet protocol (IP) address information. Needles to say, many users have no ready access to this information, let alone an understanding of how it is used. Such users are familiar only with selecting a desktop icon when they want to connect to the Internet and do not understand how such connection details are used.

Assigning a configuration password. All access point configuration tools, whether accessed via a simple Web browser or special operating system software, can have an access password. Many users are familiar with setting up user name/password pairs so this requirement may not pose a significant challenge.

Establishing a network password (often known as a WEP (wired equivalent privacy) encryption key in many configuration tools). Although familiar with passwords in general, many users may not understand the difference between network passwords (used to establish secure connections) and configuration passwords.

Because of these and other challenges faced by a user in setting up a wireless network, the total number of users that have adopted the technology to date continues to be small. Indeed, the problem may soon get even worse inasmuch as the emerging 802.1x standard will include the use of authentication servers that users will need to interface with when connecting to their network. This presents an additional level of configuration that will act as an impediment to wide scale adoption of wireless networks in the home and small office unless the configuration and installation process is made easier.

SUMMARY OF THE INVENTION

In one embodiment, an installer application is used to automatically discover an access point to be installed in a wireless network and associate the access point with an authentication center adapted to provide remote authentication services for the wireless network. Automatically discovering the access point may generally include executing an address resolution protocol scan of nodes on the wireless network and identifying from scan results the access point to be installed. This may be accomplished by transmitting a request for a signature to any node that responds to the scan and then comparing signature responses from the various answering nodes to a list of known access point devices to determine the type of access point being connected to the network.

The access point may be readied for automatic configuration using passwords for administrator access. This may a manufacturer's default password or a user-supplied custom password. In either case, a secure channel with the authentication center is established and configuration information regarding the access point is transmitted to the authentication center via the secure channel. Thereafter, an address and an SSID that correspond to the authentication center are set for the access point and 802.1x authentication for the wireless network may be established.

A further embodiment allows for automatically configuring a wireless access point to employ 802.1x authentication for a wireless network of which it is a node by identifying the access point, and then associating the access point with a remote authentication center to provide 802.1x authentication services for the wireless network. The access point may be identified using a host computer communicatively coupled thereto, for example via a wireless or other network interface. The access point may be associated with the remote authentication center via an exchange of access point configuration information and authentication center information.

Another embodiment provides for establishing a remote authentication center to act as an 802.1x authenticator for a wireless network by first identifying an access point for the wireless network and then automatically associating the access point with the remote authentication center. This process involves setting an authentication center address for the access point and enabling 802.1x authentication for the wireless network.

BRIEF DESCRIPTION OF THE DRAWINGS

The present invention is illustrated by way of example, and not limitation, in the accompanying drawings, in which.

DETAILED DESCRIPTION

Figure 1:
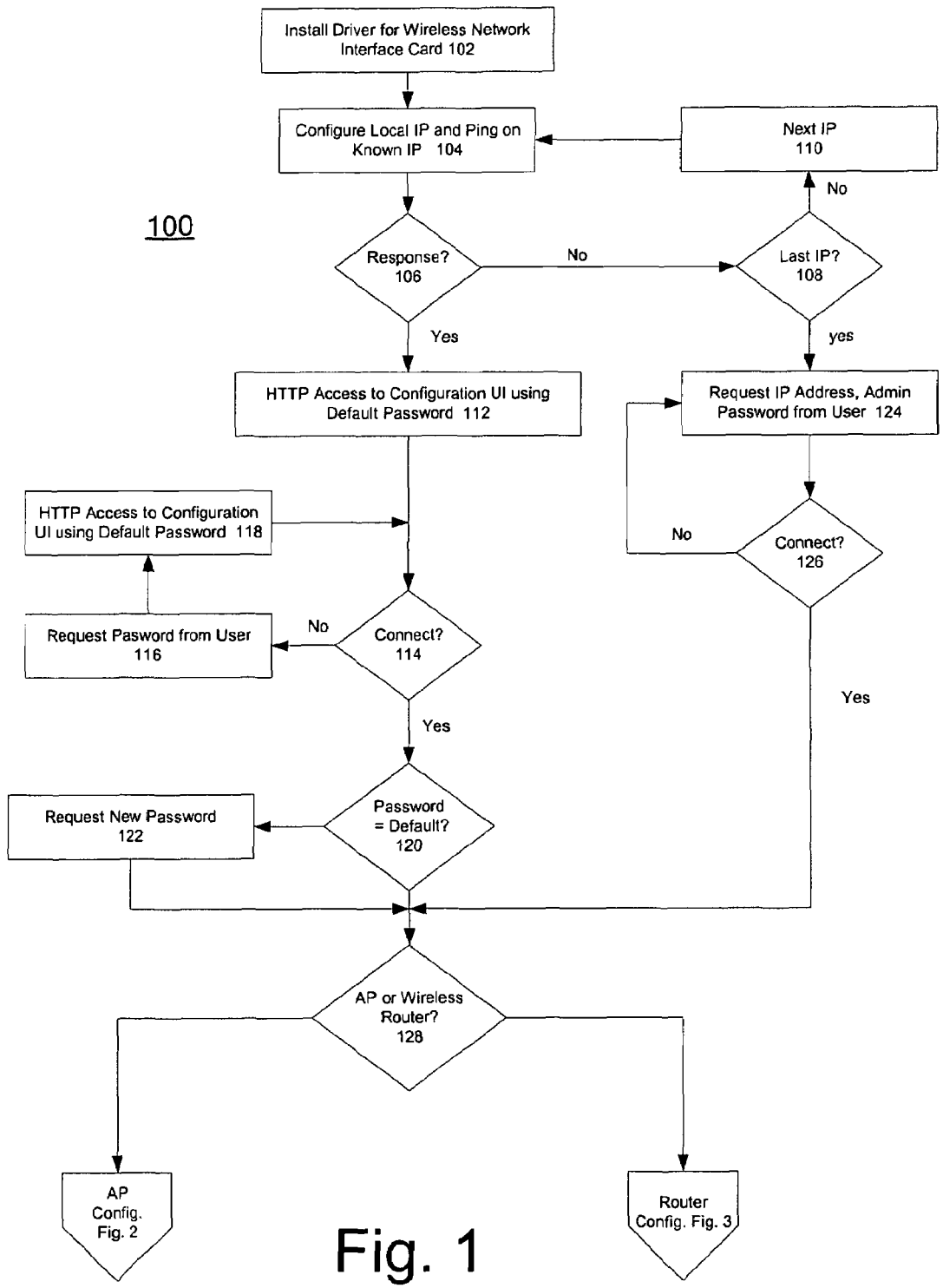
FIG. 1 is a flow diagram illustrating initial configuration of a wireless network interface card for a client computer in accordance with one embodiment of the present invention.

Described herein are installation and configuration processes for use in wireless computer networks and, in particular, a process for the automated configuration of an 802.1x network in which limited user interaction is required. As wireless networking products begin to incorporate features required by the emerging 802.1x standard, users will be faced with having to configure not only one or more access cards and access points, but also the authentication server. The present invention removes much of the user involvement from the configuration process so as to simplify the installation of a wireless network.

Before proceeding to discuss aspects of the present invention in detail, some definitional concepts are useful. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. In this discussion, algorithmic process are described with the aid of flow diagrams so as to better communicate aspects of the present invention to the reader.

Further, unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Moreover, as used herein, the term module refers to a modular data or code resource. A table can be any data structure.

The present invention provides an automated configuration process for a wireless network (e.g., an 802.1x network) that can be downloaded (and/or executed) from an external server or from another computer-readable medium (e.g., a CD-ROM, floppy disk or other another computer system). This downloaded software (i.e., a set of computer-readable instructions which, when executed by a computer processor cause the processor to perform actions in accordance with the instructions) may be instantiated as a single utility application that is operating system independent and that performs some or all of the following operations on behalf of the user:

1. Configures the local wireless network interface card to support 802.1x.
2. Opens communications with a local 802.1x-enabled wireless access point through a unique discovery process.
3. Determines any value-added capabilities of the wireless access point.
4. Enables WEP encryption between the client computer and the wireless access point (which may include the use of cryptographic checksums as described in a related U.S. Provisional Patent Application No. 60/403,105, entitled "Security Enhancements for Wireless Networks that Employ Wired Equivalent Privacy", filed Aug. 12, 2002, by the present inventors, assigned to the assignee of the present invention and incorporated herein by reference).
5. Configures the wireless access point to communicate with a designated authentication server (e.g., one or more authentication servers operated by the assignee of the present invention).
6. Registers the user's network with the authentication server.
7. Register's the user's accounts with the authentication server (in cases where the user has such accounts).

In carrying out the above procedures, the user is required to provide only a minimal amount of information about the network environment, apart from basic information required to perform any installation (e.g., account numbers, where applicable; authentication credentials; and preferred access levels). In some cases, default information is used, for example, where unsophisticated users are unsure of what information is being requested or is required.

Turning now to FIG. 1, a flow diagram describing an initial configuration process 100 for a client network interface card is shown. Such a configuration process may be used upon initial set up a new wireless network, or when upgrading an existing wireless network to 802.1x compatibility. This routine may be downloaded and/or executed from a remote server or from a CD-ROM or other computer-readable media.

At step 102, appropriate drivers for the interface card are installed. A driver is a computer program that interacts with a particular device or special kind of software. The driver contains the special knowledge of the device or special software interface that programs using the driver do not. In personal computers, a driver is often packaged as a dynamic link library file. In some cases, drivers may be resident or may have been shipped with the computer operating system. In other cases, new drivers will need to be installed. The automated installation of such drivers (e.g., upon detecting the presence of a new network interface card) is well known in the art. The wireless interface card may be any of several devices from any of a number of vendors and may include interface cards adapted for user with PCMCIA (or PC Card) interfaces, USB interfaces, PCI interfaces or other well-known computer interface designs.

Once the appropriate driver has been installed, the interface card is automatically configured with the IP address of the client computer system and begins to search for the local access point or wireless router. This discovery process is illustrated at steps 104-110. In general, the wireless access card begins a search for a wireless access point/wireless router by "pinging" the device on a known IP address (step 104). Ping is a conventional utility used to determine whether or not a specific IP address is accessible. It works by sending a packet to the designated IP address and listening for a response.

Conventional wireless access points/routers are shipped from the manufacturer with a known IP address. That is, an IP address that is to be used for communications between the access point/router and its client network interface cards. In accordance with the present invention, the network interface card searches for an access point/router by trying different known IP addresses for such devices until a response is received (step 106). For each IP address that is tried, if there is no response the card checks to see if that most recently tried IP address is the last in its list (step 108) and if not goes on to the next IP address (step 110). Situations where the list of known IP addresses (which may be stored in a table in the driver software) is exhausted without a response from an access point/router are discussed below.

Once a response from the wireless access point/wireless router is received (step 106), the network interface card begins communicating with the access point/router using the hyper text transfer protocol (HTTP) and a default password (step 112). Note that this communication is hidden from the user. That is, the network interface card begins the configuration process without exposing the details of the process to the user. Instead, the user may be presented with informational screens during the configuration process.

As indicated above, the network interface card attempts to begin communication with the access point/router using a default password. Just as such devices are shipped from the manufacturer with a default IP address, so too are the devices shipped with default passwords for use during initial configuration. As before, the present invention allows the interface card to cycle through a list of known passwords for the various access points/routers in an effort to establish a connection (step 114).

If no connection is established using a default password, this is an indication that the user has previously established a separate password for configuring the wireless access point/router (e.g., during a previous installation). In such cases, it can be assumed that the user is moderately sophisticated (i.e., the user is at least aware of how to establish such passwords) and so the software prompts the user to enter the previously established password at step 116. Using this password supplied by the user, the network interface card attempts to contact the access point/router (step 118).

Note that it may sometimes be the case that a user other then the one currently installing the new driver may have established the access point/router configuration password. Thus, the present user may not know the password. In such cases, the present invention may allow for prompting the user to reset the access point/router (usually accomplished by depressing a button on the access point/router) in order to reestablish the factory default settings for the device. Once those default settings have been reestablished, the installation procedure may continue.

At this point, the software may provide an indication to the user (e.g., in the form of a screen displayed at the client computer) that the default password is currently being used to access the configuration utilities of the wireless access point/router (step 120). Of course, if a custom password is being used, the message may indicate same. The software may then prompt the user to optionally enter a new password (step 122). If such a password is entered, this will be used as the new password for accessing the configuration utilities of the wireless access point/router.

The above procedures assumed that the network interface card was able to gain access to the wireless access point/router using the default IP address of the device. In cases where this is not so, this is an indication that the user is fairly sophisticated and has established a new IP address for the device during a previous network installation (or at some other time prior to the present driver set up). In these cases it will be necessary to prompt the user and request the IP address and (likely) the user-assigned password for the wireless access point/router (step 124). With these parameters the network access card may again attempt to connect with the device (step 126). As before, if no connection can be established or if the user does not have the requested information, a hardware reset of the wireless access point/router may be used to reestablish factory default settings so that installation may continue in accordance with the present invention.

At this point, the network interface card is in communication with the wireless access point/router. However, the remaining configuration details will vary depending on whether or not the device is a wireless access point or a wireless router. Therefore, at step 128, this determination is made (e.g., by querying the device or the user, or by reading configuration information provided by the device during initial handshaking).

Figure 2:
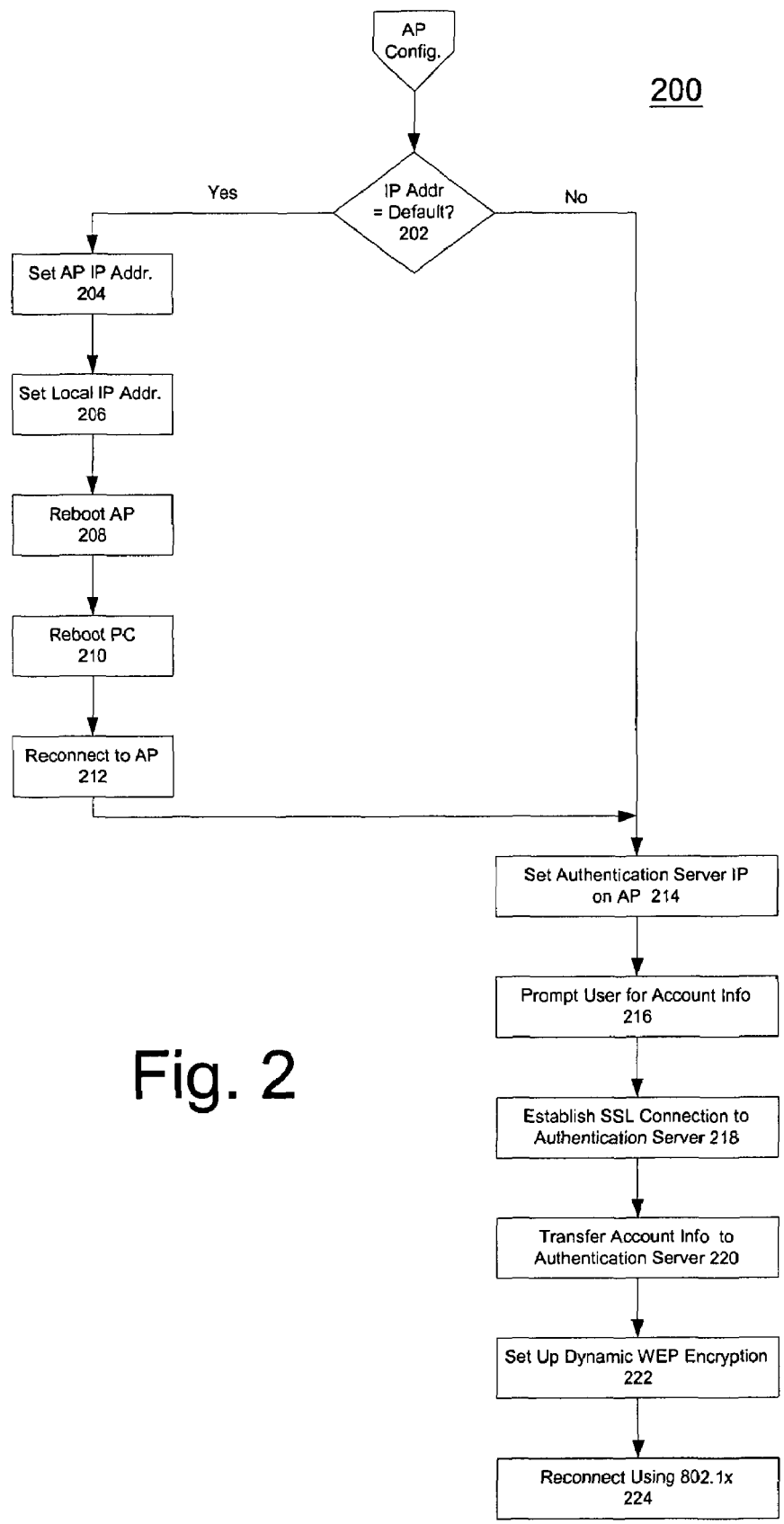
FIG. 2 is a flow diagram illustrating initial configuration of a wireless access point in accordance with one embodiment of the present invention.

FIG. 2 provides a flow diagram illustrating a process 200 for completing the configuration procedure where a wireless access point is being used. In cases where the default IP address was used to establish connection between the wireless access point and the network interface card (step 202), an optional procedure for changing that IP address may be executed. During this process, new IP addresses for the access point (step 204) and the network interface card (step 206) are set. These new passwords may be reported to the user for recording. The access point is rebooted (step 208) so that the new IP address will take effect and, if necessary, so too is the client computer system rebooted (step 210). Thereafter, connection between the network interface card and the access point is reestablished using the new IP addresses (step 212).

Thereafter, or in cases where a custom IP address is already being used, or where the user does not wish to establish custom IP addresses, the configuration process continues at step 214 with the access point being provided with the IP address of the external authentication server that will be used. In some cases, this will require the user to enter the information, however, the preferable approach is for the driver software to provide this information automatically. In either case, though, it may be necessary to prompt the user to enter his/her account information (step 216), such as a user name/password combination or some other account identification criteria (e.g., in some cases, the credit card number and/or the invoice number used to purchase the software/hardware could be used as the account information).

With the account information, the access point now establishes a secure session with the authentication server (e.g., an SSL encrypted session) (step 218). This may require connecting to the Internet using the user's existing broadband (or other) Internet connection or, in cases where the authentication server is on the same network as the access point, simply contacting that server using the IP address provided. The account information is then used to set up an account for the user and log the user into the authentication server (step 220).

At this point the configuration process may set up dynamic WEP encryption, if available, (step 222) and/or enable the use of cryptographic checksums as described in the above-cited provisional patent application. Although not shown in the diagram, the driver may also optionally upgrade existing interface card firmware to 802.1x standard compliance. Thereafter, the access point may reconnect with the authorization server using 802.1x protocols (step 224) and complete the configuration process.

Figure 3:
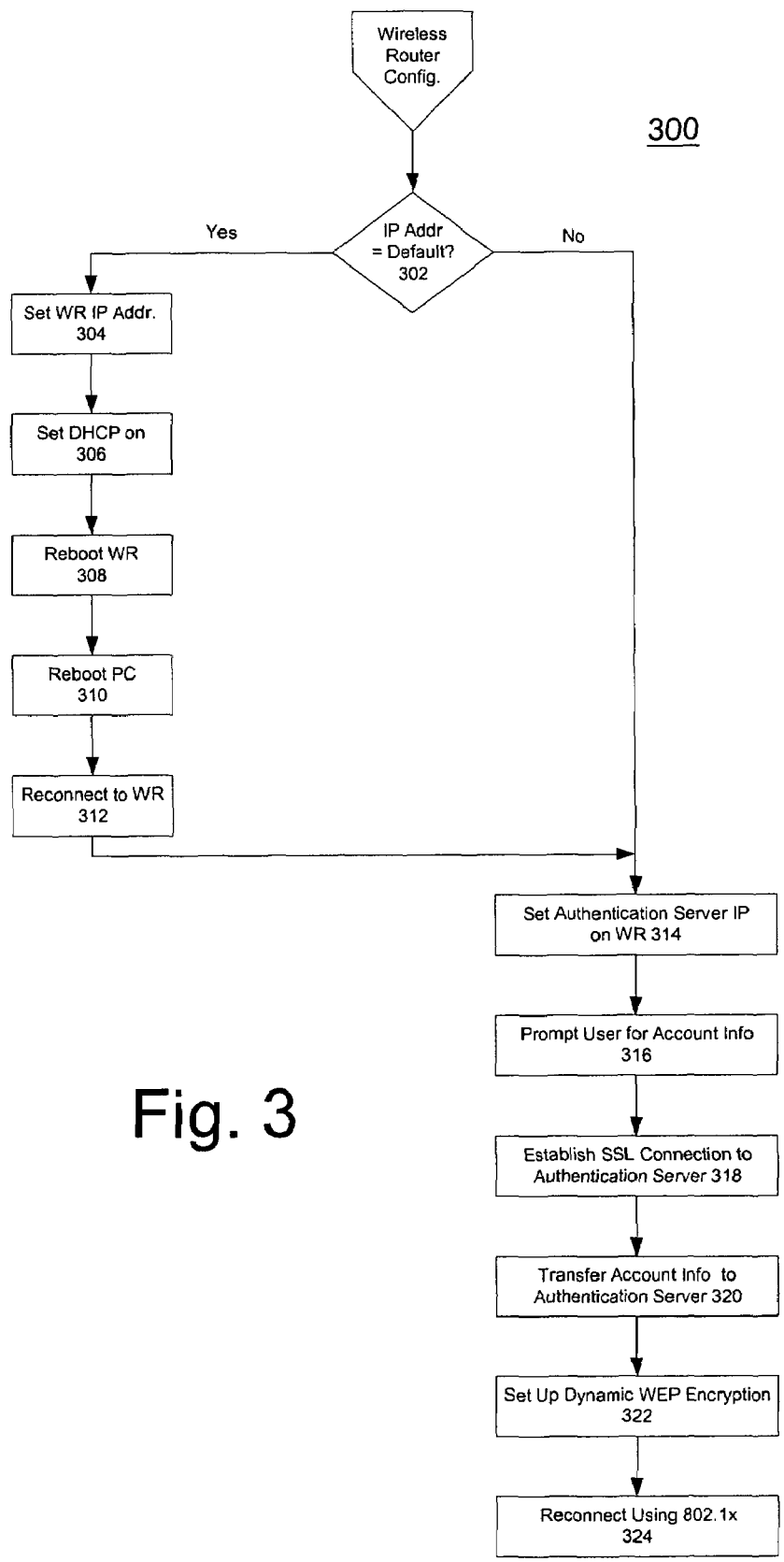
FIG. 3 is a flow diagram illustrating initial configuration of a wireless router in accordance with one embodiment of the present invention.

FIG. 3 illustrates a flow diagram for a process 300 used when completing the configuration procedure where a wireless router is involved. In cases where the default IP address was used to establish connection between the wireless router and the network interface card (step 302), an optional procedure for changing that IP address may be executed. During this process, a new IP addresses for the wireless router (step 304) is set (and optionally reported to the user) and the router's DHCP (dynamic host configuration protocol) capability is turned on. With dynamic addressing a device can have a different IP address every time it connects to the network. In some systems, the device's IP address can even change while it is still connected. DHCP also supports a mix of static and dynamic IP addresses and simplifies network administration because the software keeps track of IP addresses rather than requiring an administrator to manage the task.

The access point is rebooted (step 308) so that the new IP address will take effect and, if necessary, so too is the client computer system rebooted (step 310). Thereafter, connection between the network interface card and the wireless router is reestablished using the new IP addresses (step 312).

Next, or in cases where a custom IP address is already being used, the configuration process continues at step 314 with the wireless router being provided with the IP address of the external authentication server that will be used. In some cases, this will require the user to enter the information, however, the preferable approach is for the driver software to provide this information automatically. In either case, though, it may be necessary to prompt the user to enter his/her account information (step 316), such as a user name/password combination or some other account identification criteria (e.g., in some cases, the credit card number and/or the invoice number used to purchase the software/hardware could be used as the account information).

With the account information, the wireless router now establishes a secure session with the authentication server (e.g., an SSL encrypted session) (step 318). This may require connecting to the Internet using the user's existing broadband (or other) Internet connection or, in cases where the authentication server is on the same network as the access point, simply contacting that server using the IP address provided. The account information is then used to set up an account for the user and log the user into the authentication server (step 320).

At this point the configuration process may set up dynamic WEP encryption, if available, (step 322) and/or enable the use of cryptographic checksums as described in the above-cited provisional patent application. Although not shown in the diagram, the driver may also optionally upgrade existing interface card firmware to 802.1x standard compliance. Thereafter, the access point may reconnect with the authorization server using 802.1x protocols (step 324) and complete the configuration process.

The present invention may also provide for the automated installation and configuration of the wireless access point (AP)/router as the initial step in establishing a new wireless network or adding one or more APs or routers to an existing network. Such an installation and configuration process for an AP/router in accordance with an embodiment of the present invention includes of the following phases:

1. Initial Setup;
2. Account Creation;
3. AP Discovery;
4. User selection of AP to install;
5. AP Administrative Access;
6. Association of AP with Authentication Network;
7. Transfer of the installation data the Authentication Center; and
8. Configuration of the selected AP.

These phases are described in detail below.

Initial Setup: During this phase, the user connects the AP to an existing network that contains a computer from which an installer routine (which is an embodiment of the present invention) will be run (e.g., a personal computer or server attached to the network), or creates a new physical network that will contain the AP. In either case, for a new AP the user connects the host from which the installer will be run to the AP and uses the manufacturer's installation mechanism to change the default IP address of the device so that the AP can coexist on the new or existing network. The AP is initially configured with WEP encryption disabled (the default for most APs).

Account Creation: Prior to running the installer, the user needs to establish an account with an authentication network. The authentication network is a third party network accessible via the Internet or other network and provides authentication services for the user's network. That is, the authentication network acts to provide remote 802.1x services for user's network on a pay-for-service or other basis. Examples of such remote authentication networks are provided in U.S. Provisional Patent Application 60/476,364, entitled "Methods and Systems of Remote Authentication for Computer Networks" filed Jun. 5, 2003, assigned to the assignee of the present invention and incorporated herein by reference. A service agreement with the authentication network may be established through a web application running at an authentication center associated with the authentication network. At the beginning of the AP installation process, the user will be asked to authenticate him/her-self using the credentials established during the account creation process.

Figure 4:
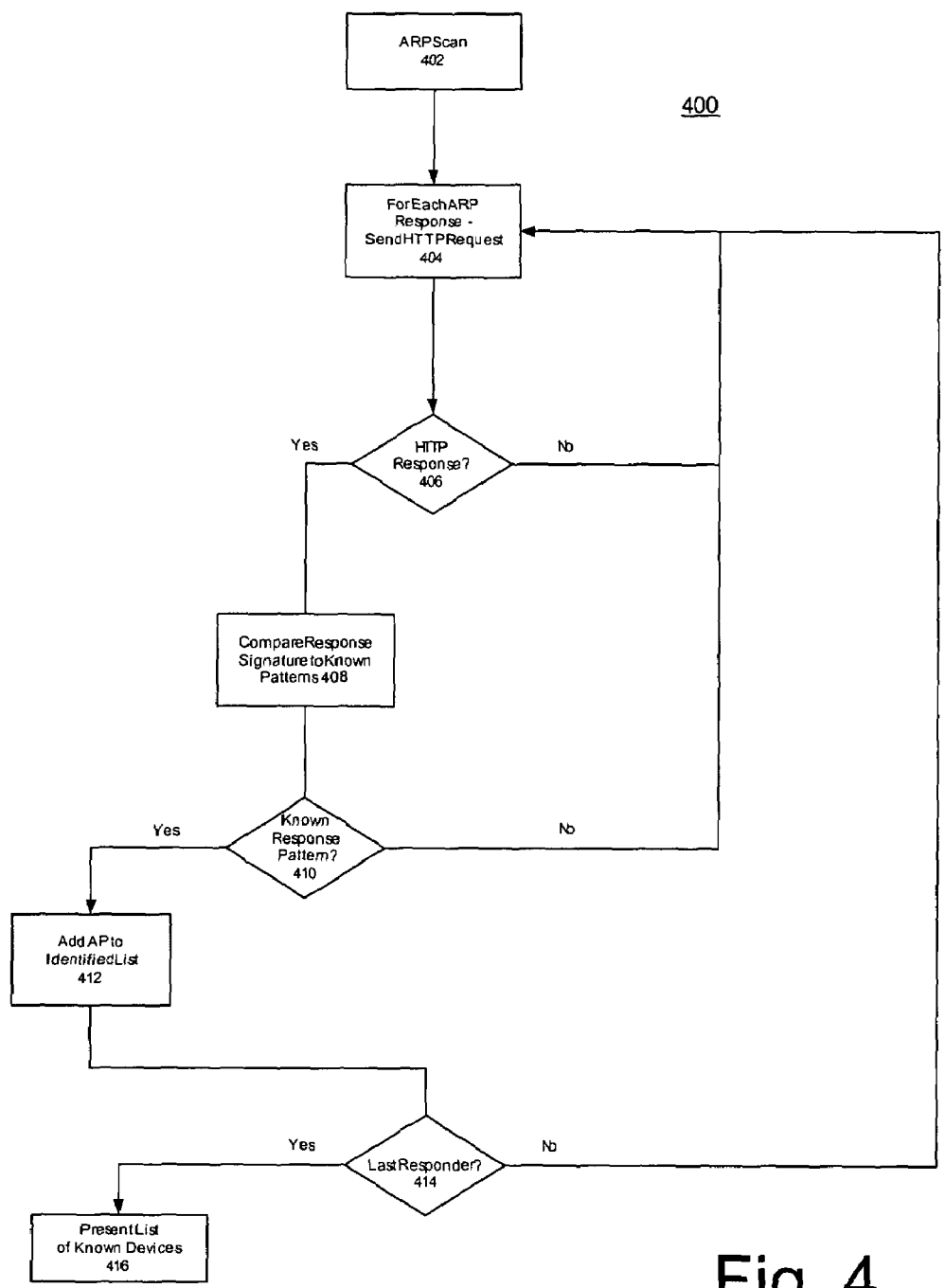
FIG. 4 is a flow diagram illustrating an access point discovery process in accordance with one embodiment of the present invention.

Installer AP Discovery: Once the AP has been configured to run on the user's target network, the installer application is started. The first step in the installation process is to discover APs that may be configured on the local subnet. This discovery process is represented by process 400, shown in the flow diagram shown of FIG. 4, and proceeds as follows:

1. The installer runs an ARP (Address Resolution Protocol) scan on the local subnet (step 402).
2. For each responder to the scan, the installer sends an HTTP request on common port 80 (step 404). Note that although this process occurs using the HTTP protocol, the same methods might be used with alternate protocols (e.g., SNMP, Telnet, etc.).
3. If the target device answers with an HTTP response (step 406), the signature of the response is compared to signature patterns for know devices (step 408). Specifically, the installer routine examines Authentication Realm information, MAC addresses (which contain the manufacturer's signature), server information and other HTTP response parameters.
4. If the response matches a known signature pattern (step 410), the device is added to the known AP list (step 412). The known device list contains information such as the manufacturer, model number and firmware revision of various commercially available APs, routers, etc.
5. This process continues until all of the ARP responders are examined (step 414), at which point the user is presented with a list of known and supported AP devices (step 416).

Figure 5A:
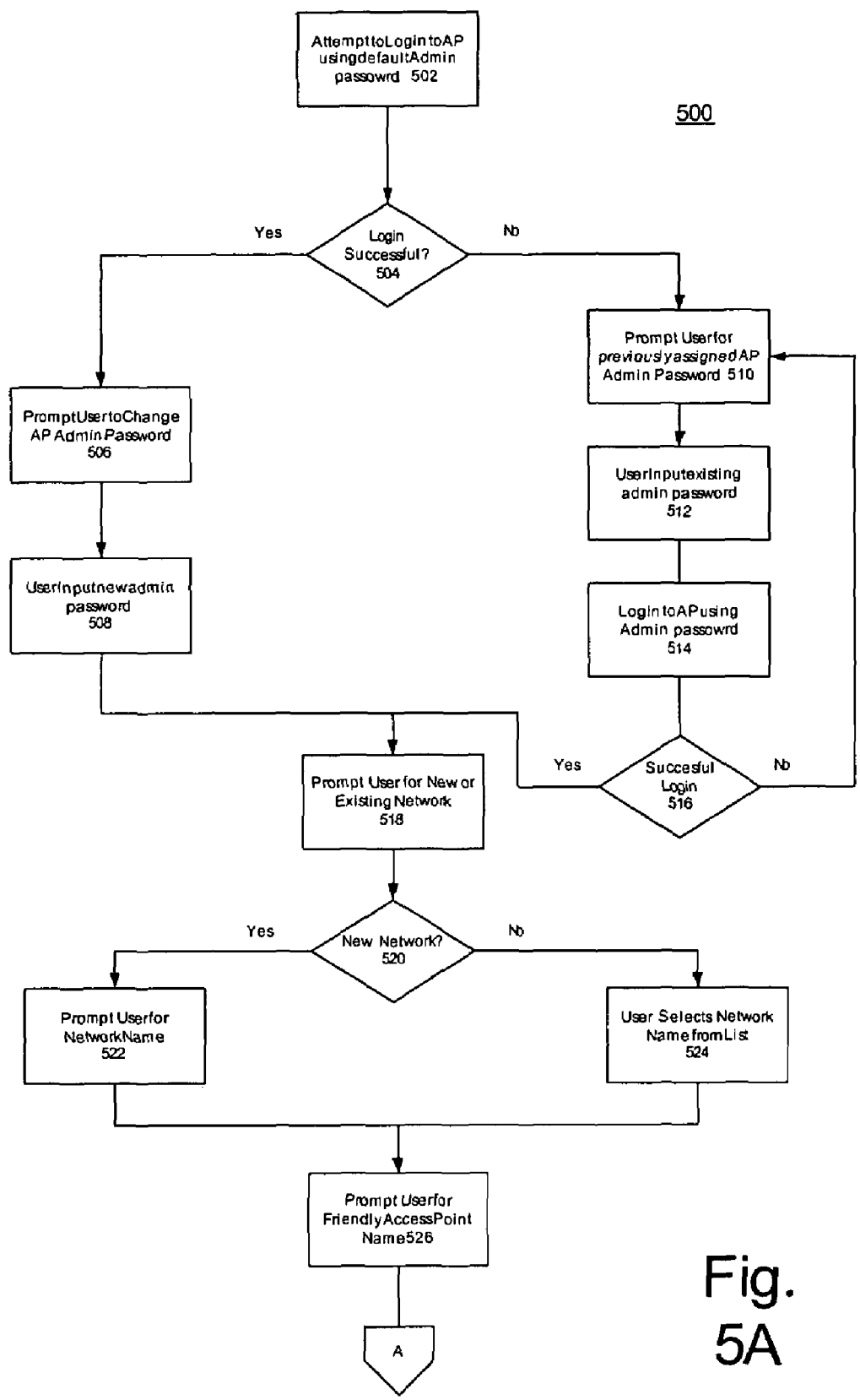
FIGS. 5A and 5B are flow diagrams illustrating configuration operations for a wireless access point in accordance with one embodiment of the present invention.
Figure 5B:
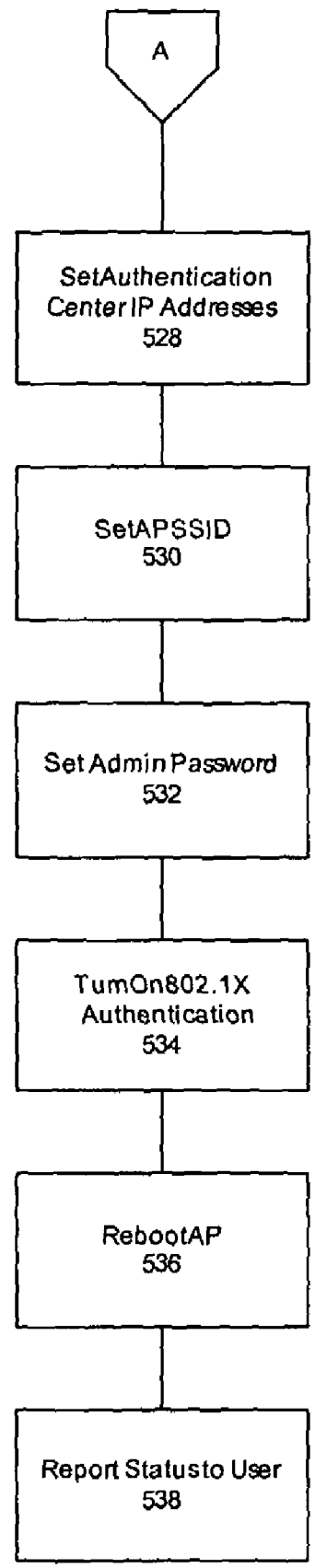

User AP Selection: After the installer presents the list of known APs to the user, the user may select the device to be installed in the network. In the following description, the installer interacts with the AP using the manufacturer's HTTP interface. However, depending upon the AP device, this interaction could occur using other communication protocols (e.g., Telnet, SNMP, etc.). The AP configuration process 500 is represented in FIGS. 5A and 5B.

AP Administrative Access: The configuration phase of the installation process begins with the user establishing administrator access.
1. The installer begins by attempting to access the AP using the manufacturer's default administration user ID and password (step 502).
2. If this succeeds (step 504) the user is required to provide a password other than the default (steps 506 and 508).
3. If this initial login attempt fails, it is an indication that the user has changed the default AP settings. The user is then prompted to provide the administrative password (steps 510-514). The installer then uses this password supplied by the user to again attempt a login to the AP.
4. If the second login attempt fails (step 516), the user is routed back to the password prompt.
5. Once the installer is able to login to the AP as the administrator (step 516), it proceeds to the next installation phase.

Association of AP with WSC Network: During this phase, the installer will communicate with the authentication center to gather a list of networks associated with this user. Note that it is common for multiple APs to be associated with a common network. By assigning multiple APs to a single network, it is possible to significantly increase the range of the network.
1. The installer begins this phase by asking user whether he/she wishes to associate this AP with a new or existing network (step 518).
2. If a "new network" is selected (step 520), the user is prompted for the network name (step 522).
3. If "existing network" is selected, the user presented with the list of networks that he/she has established through previous installation sessions (step 524).
4. The user is then asked for a "friendly" access point name that can be used to identify this specific device within the network (step 526).

Communication with the Authentication Center: The installer then establishes and HTTPS session with the authentication center and uses this channel to pass the AP configuration data. The authentication center then associates this AP and network information with the user's account.

AP Configuration: During this phase, the installer writes the configuration information it has gathered to the AP. This proceeds as follows:

1. The authentication center IP addresses are set (step 528).
2. The AP SSID is set to the authentication network name (step 530).
3. The administrative password is set if it has changed (step 532).
4. 802.1x authentication is enabled (step 534).
5. The AP is rebooted (step 536).

If, for any reason, the configuration process fails installer establishes a connection with the authentication center to indicate that a failure has occurred. The configuration association is then removed from the user's account. Upon successful completion of the installation, the AP status is reported to the user (step 538).

Thus, installation and configuration processes for use in wireless computer networks have been described.

What is claimed is:

1. A computer-implemented method, comprising:
   automatically discovering an access point to be installed in a wireless network; and
   associating the access point with an authentication center adapted to provide remote authentication services for the wireless network;
   wherein prior to associating the access point with the authentication center, the access point is automatically configured for administrator access, where configuration information reflects the configuration;
   wherein associating the access point with the authentication center comprises establishing a secure channel with the authentication center and transmitting the configuration information regarding the access point to the authentication center via the secure channel;
   wherein associating the access point with the authentication center further comprises setting an authentication center address for the access point;
   wherein associating the access point with the authentication center further comprises setting an SSID that corresponds to the authentication center for the access point.

2. The computer-implemented method of claim 1, wherein automatically discovering the access point comprises executing an address resolution protocol scan of nodes on the wireless network and identifying from scan results the access point to be installed.

3. The computer-implemented method of claim 2, wherein identifying from scan results the access point to be installed comprises, for a response to the address resolution protocol scan, transmitting a request for a signature and comparing a signature response thereto to a list of known access point devices to determine a type corresponding to the access point.

4. The computer-implemented method of claim 1, wherein automatically configuring the access point for administrator access comprises automatically accessing the access point using a manufacturer's default identifiers and then prompting a user to supply custom administrator identifiers for future use.

5. The computer-implemented method of claim 4, wherein automatically configuring the access point for administrator access further comprises programming the access point with user-supplied the custom administrator identifiers.

6. The computer-implemented method of claim 1, wherein associating the access point with the authentication center further comprises enabling 802.1x authentication for the wireless network.

7. A method, comprising automatically configuring a wireless access point to employ 802.1x authentication for a wireless network of which it is a node by identifying the access point, and then associating the access point with a remote authentication center to provide 802.1x authentication services for the wireless network;

wherein prior to associating the access point with the authentication center, the access point is automatically configured for administrator access, where configuration information reflects the configuration;

wherein associating the access point with the remote authentication center comprises establishing a secure session with the remote authentication center and transmitting the configuration information regarding the access point to the remote authentication center via the secure session;

wherein associating the access point with the remote authentication center further comprises setting an authentication center address for the access point;

wherein associating the access point with the remote authentication center further comprises setting an SSID that corresponds to the remote authentication center for the access point.

8. The method of claim 7, wherein identifying the access point is accomplished through a host computer communicatively coupled to the access point.

9. The method of claim 8, wherein the host computer is communicatively coupled to the access point via a wireless interface.

10. The method of claim 7, wherein prior to associating the access point with the remote authentication center, the access point is accessed using an administrator password.

11. The method of claim 10, wherein the administrator password comprises a manufacturer's default password.

12. The method of claim 10, wherein the administrator password comprises a custom password.

13. The method of claim 7, wherein associating the access point with the remote authentication center comprises exchanging access point configuration information with the remote authentication center.

14. A method, comprising establishing a remote authentication center to act as an 802.1x authenticator for a wireless network by first identifying an access point for the wireless network and then automatically associating the access point with the remote authentication center;

wherein prior to associating the access point with the authentication center, the access point is automatically configured for administrator access, where configuration information reflects the configuration;

wherein automatically associating the access point with the remote authentication center comprises establishing a secure channel with the remote authentication center and transmitting the configuration information regarding the access point to the remote authentication center via the secure channel;

wherein automatically associating the access point with the remote authentication center further comprises setting an authentication center address for the access point;

wherein automatically associating the access point with the remote authentication center further comprises setting an SSID that corresponds to the remote authentication center for the access point.

15. The method of claim 14, wherein automatically associating the access point with the remote authentication center further comprises enabling 802.1x authentication for the wireless network.

16. The computer-implemented method of claim 1, wherein the SSID is set to a name of the wireless network.

17. The computer-implemented method of claim 1, wherein automatically associating the access point with the remote authentication center further comprises rebooting the access point.

18. The computer-implemented method of claim 1, wherein a plurality of access points are each installed in the wireless network.

19. The computer-implemented method of claim 1, wherein associating the access point with the authentication center further comprises enabling a dynamic host configuration protocol (DHCP) for the access point.

20. The computer-implemented method of claim 1, wherein automatically discovering the access point to be installed in the wireless network comprises adding available access points in the wireless network to a known access point list.

21. The computer-implemented method of claim 20, wherein the known access point list includes information associated with known access points, including a manufacturer, a model number and a firmware revision.

22. The computer-implemented method of claim 20, wherein automatically discovering the access point to be installed in the wireless network further comprises a user selecting the access point to be installed from the known access point list.

23. The computer-implemented method of claim 1, wherein the authentication center associates the access point and the transmitted configuration information regarding the access point with a user account.

24. The computer-implemented method of claim 3, wherein comparing the signature response comprises examining authentication realm information, a MAC address, server information, and an HTTP response parameter.

25. A system for installing an access point in a wireless network, comprising:

a processor for automatically discovering an access point to be installed in a wireless network, and associating the access point with an authentication center adapted to provide remote authentication services for the wireless network;

wherein prior to associating the access point with the authentication center, the access point is automatically configured for administrator access, where configuration information reflects the configuration;

wherein associating the access point with the authentication center comprises establishing a secure channel with the authentication center and transmitting the configuration information regarding the access point to the authentication center via the secure channel;

wherein associating the access point with the authentication center further comprises setting an authentication center address for the access point;

wherein associating the access point with the authentication center further comprises setting an SSID that corresponds to the authentication center for the access point.

26. A computer program product embodied on a computer readable medium for installing an access point in a wireless network, comprising:

computer code for automatically discovering an access point to be installed in a wireless network; and computer code for associating the access point with an authentication center adapted to provide remote authentication services for the wireless network;

wherein prior to associating the access point with the authentication center, the access point is automatically configured for administrator access, where configuration information reflects the configuration;

wherein associating the access point with the authentication center comprises establishing a secure channel with the authentication center and transmitting the configuration information regarding the access point to the authentication center via the secure channel;

wherein associating the access point with the authentication center further comprises setting an authentication center address for the access point;

wherein associating the access point with the authentication center further comprises setting an SSID that corresponds to the authentication center for the access point.

* * * * *